Dec. 2, 1952

H. E. GIROZ 2,620,465

APPARATUS FOR ELECTRIC VOLTAGE AND CURRENT REGULATION

Filed Feb. 25, 1948

*Inventor*
HENRI EDMOND GIROZ

By O'Boyle & Blair
*Attorney*

Patented Dec. 2, 1952

2,620,465

UNITED STATES PATENT OFFICE 2,620,465

APPARATUS FOR ELECTRIC VOLTAGE AND CURRENT REGULATION

Henri Edmond Giroz, Paris, France

Application February 25, 1948, Serial No. 10,644
In France September 6, 1943

Section 1, Public Law 690, August 8, 1946
Patent expires September 6, 1963

16 Claims. (Cl. 322—27)

The present invention relates to apparatus for electric voltage and current regulation, and more particularly to an improved method of and apparatus for feeding alternating or direct current to arc welding devices.

An object of the invention is to provide appropriate means for simultaneously obtaining a falling shape of characteristic curve of current-voltage output (i. e. a marked diminution of the voltage across the arc when the current intensity increases from the welding up to the short-circuit value) and a relatively high power-factor, the lowering of which in alternating current supply lines is undesirable and involves an increase in the size, weight and cost of different parts of the apparatus.

It is another object of the invention to provide a simple and improved structure which can be easily built for alternating current or direct current operation, without having to use, for an alternating current welder, a moving magnetic shunt and a special bulky transformer which produces important stray fields, and for a direct current welder, without having to use a special generator with various field windings (i. e. the shunt winding, the bucking-series winding and the separately excited windings).

It is another object of my invention to avoid the use of condensers, such as are generally adopted for improving the power-factor, because they are expensive and cannot be considered as perfectly reliable in the case of welding apparatus. It is not easy, moreover, to adjust the capacity of such power-factor condensers for any value of welding current, and it is undesirable to keep them permanently connected across the mains since under no-load conditions, when the welding arc circuit is opened, a decrease in the power-factor occurs.

A feature of the invention consists in using a premagnetized inductor of which the A. C. winding is connected in the welding circuit. This inductor operates as a variable impedance, the value of which is low under normal welding conditions (which explains the high value of the power-factor), and increases rapidly when the welding current increases from its normal to its short-circuit value. Thus the welding circuit is given a "drooping characteristic," that is the slope of its current-voltage characteristic curve increases sharply when the circuit conditions vary from normal welding to a short-circuit.

Another feature of the invention consists in the combination, in a single device, of the above premagnetized inductor with a boosting transformer which increases the no-load voltage between the electrode and the work under open-circuit conditions, in order to provide the necessary "striking voltage," that is the voltage needed for starting the arc discharge. This combination transformer and reactor is hereinafter referred to as a "transreactor," and comprises three windings as follows:

(a) An alternating current winding, referred to as the "main winding," which is connected in series with the secondary winding of the welding transformer and operates, either as the secondary winding of a series booster transformer, or as a reactance winding.

(b) An alternating current winding, referred to as an "exciting winding," which is connected across the mains only when the welding circuit is open and which, at no-load, operates as the primary of the booster transformer, the secondary of which is the above mentioned main winding (a).

(c) A direct current winding, referred to as a "premagnetizing winding," which is supplied with direct current from a suitable source only when a current flows in the welding circuit, and which operates as the saturation winding of the transreactor when acting as a variable impedance.

Appropriate means are provided for avoiding any coupling or mutual inductance between the windings (a) or (b) and the winding (c).

Another feature of the invention consists in an automatic device, which operates as soon as the arc discharge is started or extinguished so that the winding (b) is connected in circuit when the D. C. source which supplies winding (c) is disconnected and vice-versa.

A further feature of the invention consists in means for independently adjusting the striking voltage and the welding and short-circuit current in winding (a) so as to suit the size and nature of the electrodes, the adjustments being effected by control means inserted in auxiliary circuits carrying but small currents so that the control means may comprise small and inexpensive accessories.

It is known that premagnetized inductors as used in the art of electric current or voltage regulation possess the following properties.

(1) If the direct current ampere turns of the premagnetizing winding are kept constant and the alternating current ampere turns in the main winding are increased, the value of the impedance increases rapidly after the A. C. ampere turns reach a particular value which depends upon the constant value of the D. C. ampere turns of the premagnetizing winding.

(2) If the alternating current ampere turns of the main winding are kept constant and the direct current ampere turns of the premagnetizing windings are decreased, the value of the impedance increases rapidly after the premagnetizing D. C. ampere turns have fallen below a particular value which depends upon the constant value given to the A. C. ampere turns of the main winding.

(3) If both the A. C. ampere turns of the main winding and the D. C. ampere turns of the premagnetizing winding are varied in opposite directions (for example so that the first increases while the second decreases), the impedance increases rapidly after the ratio between the ampere turns of the two windings reaches a particular value which depends only upon the characteristics of the magnetic circuit.

Applying the above three properties to the transreactor according to this invention, the characteristic curve showing the current-voltage variations of the transreactor has a sharply falling or drooping portion as soon as the ratio of A. C. ampere turns of the main winding ($a$) to the D. C. ampere turns of the premagnetizing winding ($c$) reaches a particular value.

In order that the invention may be clearly understood, reference will now be made to the accompanying drawings, in which.

Figure 1:
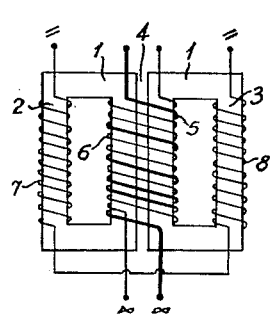
Fig. 1 shows schematically the general disposition of the magnetic circuits and the windings of one form of transreactor according to the invention.

The single-phase transreactor shown in Fig. 1 is provided with two rectangular structures 1—2 and 1—3 built up of sheet iron laminations, the four vertical limbs of which are equal in cross-section, so that the total cross-section of the two adjacent limbs 1—1, forming the central core of the magnetic circuit, is equal to twice the cross-section of each of the lateral cores 2 and 3. The adjacent legs 1—1 are separated by a gap 4, which acts as a core divider, confining each of the magnetic fluxes created in the respective side limbs to the associated portion of the central core. The central core carries two coils, 5 and 6. 5 is the A. C. main winding ($a$), and 6 is the A. C. exciting winding ($b$). Each of the side-cores 2 and 3 carries one-half of the premagnetizing winding ($c$) which is, for that purpose, divided up into two series connected coils 7 and 8. The winding 6 is wound of small gauge wire since it operates only at no-load as a primary winding which carries small currents. The series-connected coils 7 and 8 are wound and connected in such a manner that any current flowing in the windings 5 or 6 cannot induce an E. M. F. into the entire premagnetizing winding.

Figure 2:
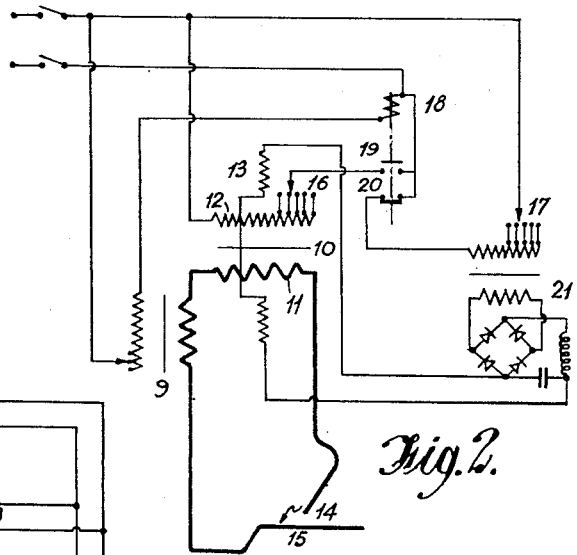
Fig. 2 shows a circuit of an arc welding installation supplied with alternating current by a single-phase transformer.

Figure 2 shows a single-phase arc welding circuit incorporating a transreactor according to the invention. In this figure, 9 is the transformer supplying the welding current from the supply mains 11 which has its primary winding connected in series with the winding of a relay 18 having two contacts 19 and 20, contact 19 being closed and contact 20 open when the relay is de-energized and contact 19 opened and contact 20 closed when the relay 18 is energized. The secondary of the transformer 9 is connected in series with the main winding 5 of the transreactor 10 and supplies welding current to the electrode 14 and the workpiece 15. The excitation winding 6 of the transreactor is provided with a series of tapping points 16 the circuit therethrough being completed from the supply mains when the contact 19 is closed. The premagnetizing winding 7—8 of the transreactor is connected across the output of a rectifier 21 through a smoothing circuit comprising a choke coil 12 and condenser 13. The rectifier 21 is fed from a secondary of a transformer 22 the primary of which is connected across the supply mains when the contact 20 is closed. This primary winding is provided with a series of tapping contacts 17.

The arrangement operates as follows:

In the case when the load circuit is open, that is when the electrode 14 is separated from the workpiece 15, upon closing the mains supply switch, only a small magnetizing current which is insufficient to actuate the relay 18, flows through the primary of the welding transformer 9. Thus the relay 18 remains de-energised with its contact 19 closed and its contact 20 open. Through the contact 19 the mains supply 11 is connected across the exciting winding 6 and under these conditions the transreactor 10 operates as a boosting series transformer to increase the voltage between the electrode 14 and the workpiece 15. This open-circuit voltage is adjusted to the necessary striking voltage by varying the tapping connection 16. During this time the contact 20 is open so that no current is fed to the rectifier 21.

As soon as the arc is struck, current flows in the welding transformer and thus also through relay 18 which is energised to open its contact 19 and close its contact 20. The opening of contact 19 disconnects the exciting winding 6 from the mains supply and the closing of contact 20 connects the rectifier 21 across the mains supply to feed the premagnetising winding 7—8. Under these conditions the transreactor works as a premagnetised inductance, the main winding 5 then acting as a variable impedance in the welding circuit the value of which increases with an increase in the welding current, and thereby produces such a voltage drop with increasing welding current that the volt-ampere curve has the above described drooping characteristic. The adjustment of the ampere-turns of the premagnetising winding is effected by adjusting the tapping connection 17 so as to suit the nature of the work and of the electrode used and to produce the desired characteristic between normal welding and short-circuit conditions, with the drooping effect beginning when the welding current reaches a given value.

Figure 3:
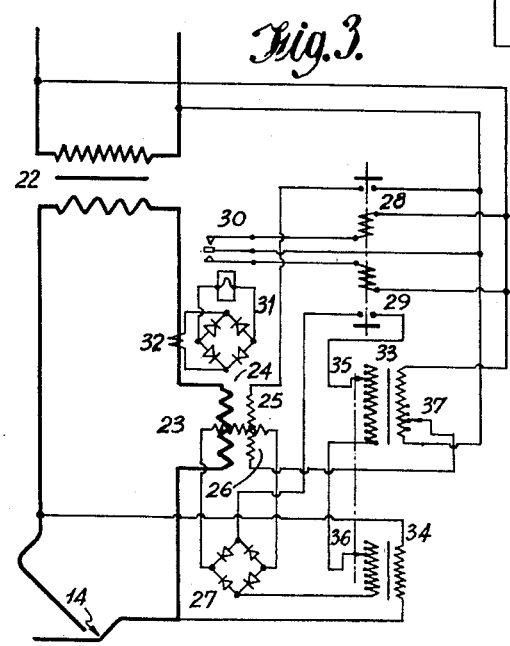
Fig. 3 shows a modified circuit arrangement for an arc welding installation supplied from single-phase alternating current.

Figure 3 shows a modified single-phase welding circuit which differs mainly from that described with reference to Figure 2 by reason of the fact that the ampere turns of the premagnetising winding of the transreactor vary in a predetermined manner, instead of remaining constant, in order to obtain a more pronounced drooping effect, that is to produce a characteristic the slope of which increases more rapidly between the normal welding and short-circuit conditions.

As in Figure 2, the load or welding circuit includes the secondary winding of the welding transformer 9 and the main winding 5 of the transreactor 10. Fed from this welding circuit is the secondary winding of a transformer 32 which is connected through a rectifier 31 to actuate a relay 30. When the relay 30 is de-energised its upper contacts 23 are closed to complete a circuit through the winding 28 of a contactor to close its associated contact 26. When the relay 30 is energised it opens its upper contacts 23 to de-energise the winding 28 and close its lower contacts 24 to complete a circuit through the winding 29 of a contactor to close its contact 27.

When winding 28 is energised a circuit is completed from the mains supply 11 through the exciting winding 6 of the transreactor via the tapping point 37 of the primary winding of a transformer 33 connected across the mains, this primary winding thus acting as an auto-transformer for the current supplied to the exciting winding 6. By altering the tapping 37, the boosting voltage in the main winding 5 may be adjusted to produce the necessary striking voltage.

When the winding 29 is energised it closes its contact 27, to complete a circuit for supplying the mains current to the rectifier 21 for feeding the premagnetising winding 7—8 of the transreactor. The voltage supplied to the rectifier 21 is obtained from the secondary windings of two transformers 33, 34, transformer 33 being fed with the mains supply current and transformer 34 having its primary connected across the arc between the electrode 14 and the workpiece 15. The secondary windings of the two transformers are provided with variable tappings 35, 36 which, for reasons hereinafter described, are preferably mechanically coupled together.

The operation of the circuit arrangement is as follows:

Upon connecting the supply mains to the installation with the load circuit open between 14 and 15, no current flows in the welding circuit and the transformer 32 supplies no current to energise the relay 30. Under these conditions the upper contacts 23 of this relay 30 are closed and complete a circuit through the exciting winding 6 of the transreactor as above explained, which induces an E.M.F. into the main winding 5 which acts as a booster voltage in series with the secondary of the weld transformer 9, thus building up the voltage across the electrode 14 and work-piece 15 to the necessary striking voltage. The value of this boosting voltage is adjusted by varying the tapping 37 on the primary winding of the transformer 33.

When the arc is struck, a current flows through the transformer 32 and rectifier 31 to energise the relay 30 which opens its upper contacts 23 to open the circuit through the exciting winding 6. By closing its lower contacts 24 the coil 29 is energised and direct current is fed to the premagnetising winding 7—8 through the rectifier 21. The voltage across the rectifier 21, and consequently the value of the ampere turns of the premagnetising winding, depends upon two voltages, namely a constant voltage supplied by the secondary winding of the transformer 33 and a variable voltage supplied by the secondary winding of the transformer 34, the primary of which is connected across the arc.

The variation of the variable voltage follows the variation of the arc voltage. The ampere turns of the premagnetising winding 7—8 thus decrease according to a predetermined law when the welding current increases. The tapping points 35, 36 on the secondary windings of the transformer 33, 34 respectively are adjusted to produce the desired characteristic curve.

Experiments have proved the theory that this arrangement produces a more accurate control of the ampere turns of the premagnetising winding, a more pronounced drooping effect of the characteristic, and improved selection of the welding and short-circuit currents according to the particular work to be welded.

Figure 4:
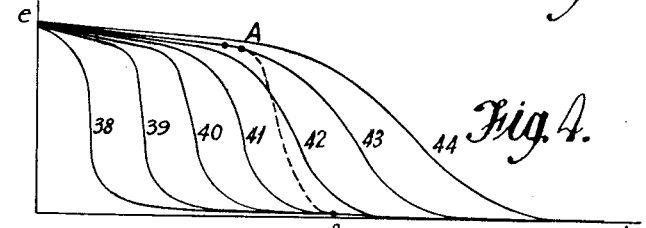
Figs. 4 and 5 are explanatory diagrams showing voltage-current characteristic curves.
Figure 5:
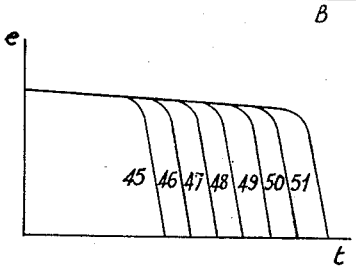

These advantages will be more clearly understood from a consideration of the series of voltage-current characteristic curves shown in Figs. 4 and 5.

Fig. 4 shows a family of voltage-current characteristics in which the ordinates represent the terminal voltage of the welding circuit and the abscissae the corresponding intensities of the welding current in this circuit, for various values of the ampere turns of the premagnetising winding. The various curves 38 to 44 correspond respectively with increasing values of the constant premagnetising ampere turns, that is with increasing values of the welding current. As is clearly shown in Fig. 4 the slope of the curves decrease with increasing values of the premagnetising ampere turns. The arrangement described with reference to Fig. 3 retains the sharply drooping characteristic of the initial curves (with lower values of premagetising ampere turns) throughout the entire range by automatically reducing the value of the premagetising ampere turns when the welding current increases, that is when the voltage across the terminals of the welding circuit decreases. For example, if the premagnetising ampere turns decrease from the value corresponding to curve 43 to that corresponding to curve 41 when the welding current increases from its normal welding value to the short-circuit value, the characteristic would then follow a new path indicated by the dotted line which starts from the point A on curve 43 and ends at the point B on curve 41, the slope of which is greater than that of either curve 43 or 41.

Fig. 5 shows a similar family of voltage-current characteristic curves 45 to 51 obtained by decreasing the total premagnetising ampere turns when the welding current increases. By a proper distribution of the total premagnetising ampere turns between a constant factor and a variable factor, the slopes of the different characteristics may be maintained approximately constant and identical irrespective of the value of the selected welding current. This result is obtained by decreasing the variable factor by greater amounts for greater values of the constant factor. This is effected with the arrangement shown in Fig. 3 by the mechanical couplings between the tapping contacts 35 and 36.

It will thus be seen that the decrease of the premagnetising ampere turns, according to a predetermined law, when the welding current increases, makes possible an easy regulation of the welding circuit according to a so-called "bent" characteristic. An increase in the value of the constant factor of the premagnetising ampere turns corresponds to an increase in the value of the welding current represented by the bend or knee of the curve. An increase in the value of the variable factor (at no-load) corresponds to an increase in the slope of the characteristic between welding and short-circuit conditions. The bent characteristic therefore offers simultaneously not only the advantages resulting from a sharply drooping characteristic but also the advantages of a good power factor.

Figure 6:
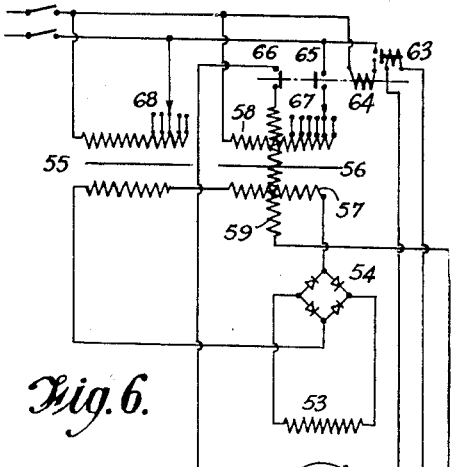
Fig. 6 shows a circuit diagram of an arc welding installation which draws its welding current from a separately excited D. C. generator, the field circuit of which is supplied by a rectifier fed from a single-phase alternating current and controlled by a transreactor.

Figure 6 shows a welding installation similar to that shown in Fig. 2 except that the controlled alternating current, instead of directly feeding the welding arc, feeds, through a rectifier 54, the field winding 53 of a D. C. welding generator 52, the D. C. output of which feeds welding electrode 14 and the workpiece 15. The power required in the field winding 53 is much less than that required for feeding the welding arc, and consequently the size of the mains supply transformer 9 and the transreactor 10 may be made much smaller in size than with the arrangement shown in Figure 2.

In the arrangement illustrated in Figure 6, the D. C. welding generator 52 has its brushes connected directly across the welding circuit. The current for its field winding 53 is supplied through the rectifier 54 from the secondary winding of the mains supply transformer 9 and the main winding 5 of the transreactor 10 connected in series therewith. In the welding circuit is connected a shunt 62 across which is connected a relay 63 which, when de-energised, closes its contact to connect the mains supply 11 through the relay 64. Under these conditions relay 64 closes its contact 65 and opens its contact 66, thus connecting the exciting winding 6 of the transreactor 10 across the mains supply. This exciting winding is provided with a series of tapping 67 for adjusting the boosting voltage induced into the main winding 5 to produce the necessary field current for producing the striking voltage for starting the discharge as soon as the electrode 14 is brought into contact with the workpiece 15. The voltage supplied by the transformer 9 is adjusted by varying the tapping 68 on its primary winding.

Upon the arc being struck, a voltage appears across the shunt 62 and energises the relay 63, thereby opening the circuit through the relay 64 to de-energise it. Relay 64 then opens its contact 65 to open the circuit through the exciting winding 6 and closes its contact 66 to connect the premagnetising winding 7—8 across the brushes of the D. C. generator 52.

Whilst some embodiments of the invention have been hereinbefore described with reference to the drawings, it will be understood that various modifications may be made, both as regards the circuit arrangements as well as the nature of the supply which can be adopted for the particular circumstances involved in any kind of regulation, whether it be for welding or similar problems, without departing from the scope of the invention.

For example, the current supply source may comprise a three-phase alternating current instead of a single-phase alternating current. The regulating equipment above described is readily applicable, with appropriate modification, to three-phase operation and for regulating either welding currents or any other electric currents needing a similar regulation. One form which such a three-phase installation might take, for instance, would consist in replacing the single-phase means of the circuit shown in Figs. 2 and 3 by a three-phase device associated with a three-phase rectifier having its D. C. terminals so connected as to supply direct current to the welding circuit, or to a D. C. generator in a manner similar to that illustrated in Fig. 6. Such arrangements have the advantage of equalising the load between three-phases of the mains supply.

I claim:

1. Apparatus for regulating the electric current and voltage fed to a load circuit, comprising a main transformer having its primary winding connected across alternating current supply mains and its secondary winding connected to the load circuit, a boosting transformer having its secondary winding connected in series with the secondary winding of the main transformer, a switch for connecting the primary winding of the boosting transformer across the supply mains, a source of direct current, a third winding associated with the secondary winding of the boosting transformer, a second switch for connecting the source of direct current to said third winding and means for simultaneously closing said first switch and opening said second switch and vice versa, said means actuating to open said first switch when current flows in the load circuit.

2. Apparatus for regulating the electric current and voltage fed to a load circuit, comprising a main transformer having its primary winding connected across alternating current supply mains and its secondary winding connected to the load circuit, a boosting transformer having its secondary winding connected in series with the secondary winding of the main transformer, a switch for connecting the primary winding of the boosting transformer across the supply mains, a source of direct current, a third winding associated with the secondary winding of the boosting transformer, a second switch for connecting the source of direct current to said third winding, means for simultaneously closing said first switch and opening said second switch and vice versa.

3. Apparatus for regulating the electric current and voltage fed to a load circuit, comprising a main transformer, a primary winding on said main transformer for connection to alternating current supply mains, a secondary winding on said main transformer connected in the load circuit, a second transformer having two independent magnetic circuits, a primary winding for connection to the supply mains associated with both said magnetic circuits, a secondary winding also associated with both said magnetic circuits and connected in the load circuit to boost the voltage applied to the load when the primaries of the main and second transformers are both energised, two further windings similar to each other on the second transformer each associated with one of said magnetic circuits and connected in series so that alternating voltages balance out, and means for supplying direct current to said further windings to promote saturation of the core of the second transformer, a switch in the primary circuit of the second transformer, and a switch controlling the supply of direct current.

4. Apparatus for regulating the electric current and voltage fed to a load circuit, comprising a main transformer, a primary winding on said main transformer for connection to alternating current supply mains, a secondary winding on said main transformer connected in the load circuit, a second transformer having two independent magnetic circuits, a primary winding for connection to the supply mains associated with both said magnetic circuits, a secondary winding also associated with both said magnetic circuits and connected in the load circuit to boost the voltage applied to the load when the primaries of the main and second transformers are both energised, two further windings similar to each other on the second transformer each associated with one of said magnetic circuits and connected in series so that alternating voltages balance out, and means for supplying direct current to said further windings to promote saturation of the core of the second transformer, a switch in the primary circuit of the second transformer, and a switch controlling the supply of direct current, and means responsive to the current drawn by the load for closing one of said switches and opening the other and vice versa.

5. Apparatus for regulating the electric current and voltage fed to an arc welding installation comprising a main transformer having its primary winding connected across a source of alternating current and its secondary winding feeding the welding circuit including the welding electrodes, a boosting transformer having its secondary winding connected in series with the secondary winding of the main transformer, a first switch for connecting the primary winding of the boosting transformer across the supply mains, a third winding on the boosting transformer, a source of direct current for feeding said third winding to form with said boosting secondary winding a premagnetised reactor, a second switch for connecting the source of direct current to said third winding, means responsive to open-circuit conditions of said welding circuit to close said first switch to increase the voltage across the welding electrodes, means responsive to current flowing in the welding circuit upon the arc being struck to open said first switch and to close said second switch, the impedance of the secondary winding of the boosting transformer then acting as a variable impedance the value of which depends upon the value of the direct current flowing through said third winding, and means for decreasing the direct current flowing through said third winding as the welding current increases between normal welding and short-circuit conditions.

6. Appartus for regulating the electric current and voltage supplied by a direct current generator having a field winding and an armature winding for supplying current to a load circuit, comprising a main transformer, a primary winding on said transformer for connection to alternating current supply mains, a secondary winding on said main transformer, a second transformer having a core, a primary winding on said second transformer for connection to the supply mains, a secondary winding on said second transformer connected in series with the secondary winding of the first transformer to boost the voltage when the primary windings of both transformers are energised, a rectifier connected to the secondary windings of the main and second transformers, means for feeding the direct current output from said rectifier to excite the field winding of the generator, a third winding on said second transformer, means for supplying a direct current derived from the armature of the generator to the third winding of the second transformer to promote saturation of the core of the second transformer, a first switch controlling the supply of current from the mains to the primary of the second transformer, a second switch for controlling the supply of direct current from the armature winding to the third winding of the second transformer, and means for simultaneously closing said first switch and opening said second switch and vice versa.

7. Apparatus for regulating the electric current and voltage supplied by a direct current generator having a field winding and an armature winding for supplying current to a load circuit, comprising a main transformer, a primary winding on said transformer for connection to alternating current supply mains, a secondary winding on said main transformer, a second transformer having a core, a primary winding on said second transformer for connection to the supply mains, a secondary winding on said second transformer connected in series with the secondary winding of the first transformer to boost the voltage when the primary windings of both transformers are energised, a rectifier connected to the secondary windings of the main and second transformers, means for feeding the direct current output from said rectifier to excite the field winding of the generator, a third winding on said second transformer, means for supplying a direct current derived from the armature of the generator to the third winding of the second transformer to promote saturation of the core of the second transformer, a first switch controlling the supply of current from the mains to the primary of the second transformer, a second switch for controlling the supply of direct current from the armature winding to the third winding of the second transformer, and means for simultaneously closing said first switch and opening said second switch and vice versa, and a relay responsive to the current in the load circuit connected to the armature winding increasing above a predetermined value for closing said second switch.

8. Apparatus for regulating the electric current and voltage fed to a load circuit comprising a main transformer, a primary winding on said main transformer connected across alternating current supply mains, a secondary winding on the main transformer connected in a load circuit, a second transformer having a core, a primary winding on said second transformer, a switch for connecting the primary winding of said second transformer across the supply mains, a secondary winding on said second transformer connected in series with the secondary winding of the first transformer to boost the voltage across said series connected secondary windings when the primary windings of both transformers are connected to the mains supply, a third winding on said second transformer, a third transformer, a primary winding on said third transformer for connection to the supply mains, a secondary winding on said third transformer, a rectifier connected to the secondary winding of said third transformer means for feeding the direct current output from said rectifier to the third winding of the second transformer to promote saturation of the core of the second transformer, a second switch for controlling the supply of direct current to the third winding of the second transformer, and means for opening said first switch when said second switch is closed and vice versa.

9. Apparatus for regulating the electric current and voltage fed to a load circuit comprising a main transformer, a primary winding on said main transformer connected across alternating current supply mains, a secondary winding on the main transformer connected in a load circuit, a second transformer having a core, a primary winding on said second transformer, a switch for connecting the primary winding of said second transformer across the supply mains, a secondary winding on said second transformer connected in series with the secondary winding of the first transformer to boost the voltage across said series connected secondary windings when the primary windings of both transformers are connected to the mains supply, a third winding on said second transformer, a third transformer, a primary winding on said third transformer for connection to the supply mains, a secondary winding on said third transformer, a fourth transformer having a primary winding connected across the load and a secondary winding connected in series with the secondary winding of the third transformer, a rectifier connected to the secondary windings of said third and fourth transformers to supply direct current to the third winding of the second transformer to promote saturation of the core of the second transformer, a switch controlling the supply of current from the mains supply to the primary of the third transformer and means for simultaneously closing one of said switches and closing the other and vice versa.

10. Apparatus for regulating the electric current and voltage fed to a load circuit comprising a main transformer, a primary winding on said main transformer connected across alternating current supply means, a secondary winding on the main transformer connected in a load circuit, a second transformer having a core, a primary winding on said second transformer, a switch for connecting the primary winding of said second transformer across the supply mains, a secondary winding on said second transformer connected in series with the secondary winding of the first transformer to boost the voltage across said series connected secondary windings when the primary windings of both transformers are connected to the mains supply, a third winding on said second transformer, a third transformer, a primary winding on said third transformer for connection to the supply mains, a secondary winding on said third transformer, a fourth transformer having a primary winding connected across the load and a secondary winding connected in series with the secondary winding of the third transformer, a rectifier connected to the secondary windings of said third and fourth transformers to supply direct current to the third winding of the second transformer to promote saturation of the core of the second transformer, a switch controlling the supply of current from the mains supply to the primary of the third transformer and means for simultaneously closing one of the said switches and a relay responsive to the current flow in the load circuit operative to close the switch in the primary circuit of the second transformer when no current is flowing and to close the switch in the primary circuit of the third transformer when current is flowing in the load circuit.

11. Apparatus for regulating the electric current and voltage fed to a load circuit, comprising a main transformer, a primary winding on said main transformer for connection to alternating current supply mains, a secondary winding on said main transformer connected in the load circuit, a second transformer comprising two shell type cores disposed with two of their limbs adjacent to and parallel with one another but separated by non-magnetic material, the other limbs of the cores being remote from one another, a primary winding for connection to the supply mains wound around the adjacent limbs of the two cores, a secondary winding also wound around the adjacent limbs of the two cores and connected in the load circuit to boost the voltage applied to the load when the primaries of the main and second transformers are both energized, two further windings similar to each other wound on the remote limbs of the two cores and connected in series so that alternating voltages induced in said further windings balance out and means for supplying direct current to said further windings to promote saturation of the core of the second transformer, a switch in the primary circuit of the second transformer and a switch for controlling the supply of direct current to the third winding of the second transformer.

12. Apparatus for controlling the electric current and voltage supplied by a direct current generator having a field winding and an armature winding for supplying current to a load circuit, comprising a main transformer, a primary winding on the main transformer for connection to alternating current supply mains, a secondary winding on said mains transformer, a second transformer comprising two shell type cores disposed with their limbs adjacent to and parallel with one another but separated by non-magnetic material, the other limbs of the cores being remote from one another, a primary winding for connection to the supply mains wound around the adjacent limbs of the two cores, a secondary winding also wound around the adjacent limbs of the two cores and connected in series with the secondary winding of the main transformer, to boost the voltage when the primary windings of both transformers are connected to the mains supply, a rectifier connected to the secondary windings of the main and second transformers to produce a direct current for exciting the field winding of the generator, two further windings similar to each other wound on the remote limbs of the two cores of the second transformer and connected in series so that alternating voltages induced in said further windings balance out, means for supplying a direct current from the armature of the generator to the further windings of the second transformer to promote saturation of the cores thereof, a switch for controlling the supply of current from the mains to the primary of the second transformer and a switch for controlling the supply of direct current from the armature winding to the further windings of the second transformer and means responsive to the flow of current in the load circuit to open the primary circuit of the second transformer, and pass direct current through the further windings of the second transformer when current flows and vice versa when no current is flowing in the load circuit.

13. Apparatus for regulating the electric voltage and current fed to a load circuit from a source of alternating current, comprising means for boosting the voltage applied to the load, means comprising a reactor having a magnetisable core connected in the load circuit and means for disconnecting said boosting means and simultaneously magnetising said core.

14. Electric regulating apparatus comprising a transformer having a core of magnetic material, a primary winding on said core, a first switch connected in the circuit of said primary winding, a secondary winding on said core, a third winding on said core, a source of direct current, a second switch for connecting said source of direct current to said third winding, and means for simultaneously closing said first switch and opening said second switch and vice versa.

15. Apparatus for regulating the electric current and voltage fed to a load circuit, comprising a main transformer having its primary winding connected across alternating current supply mains and its secondary winding connected to the load circuit, a boosting transformer having its secondary winding connected in series with the secondary winding of the main transformer, a switch for connecting the primary winding of the boosting transformer across the supply mains, a source of direct current, a third winding associated with the secondary winding of the boosting transformer, a second switch for connecting the source of direct current to said third winding, means for simultaneously closing said first switch and opening said second switch and vice versa, and means for reducing the value of the direct current fed to said third winding as the current in the load circuit increases.

16. In an arc welding installation, an apparatus for regulating the current and voltage fed to a welding circuit, comprising a main transformer having primary and secondary windings, said primary winding being connected across alternating current supply mains, a boosting transformer having a magnetic core carrying primary and secondary windings, said secondary winding of the boosting transformer being connected in series with the secondary winding of the main transformer, a first switch for connecting the primary winding of said boosting transformer across the supply mains in such manner that the voltages developed in the said series-connected secondary windings are additive, the voltage applied to the welding circuit varying in accordance with the voltage across said series-connected secondary windings, a source of direct current, a third winding on the core of said boosting transformer, a second switch for connecting the source of direct current to said third winding, actuating means for simultaneously closing said first switch and opening said second switch and vice versa, said actuating means closing said first switch when the welding circuit is open-circuited, means responsive to an increase of current in said welding circuit above a predetermined value for actuating said actuating means to open said first switch and close said second switch, and means for reducing the value of the direct current fed to said third winding as the current in the welding circuit further increases above said predetermined value.

HENRI EDMOND GIROZ.

REFERENCES CITED

The following references are of record in the file of this patent:

UNITED STATES PATENTS

| Number | Name | Date |
|---|---|---|
| 1,181,556 | Van Arco | May 2, 1916 |
| 2,310,886 | Wentz | Feb. 9, 1943 |